Dec. 3, 1929.  P. LIBBY  1,737,929
LIQUID DELIVERY AND PUMPING APPARATUS
Filed July 23, 1926  2 Sheets-Sheet 1
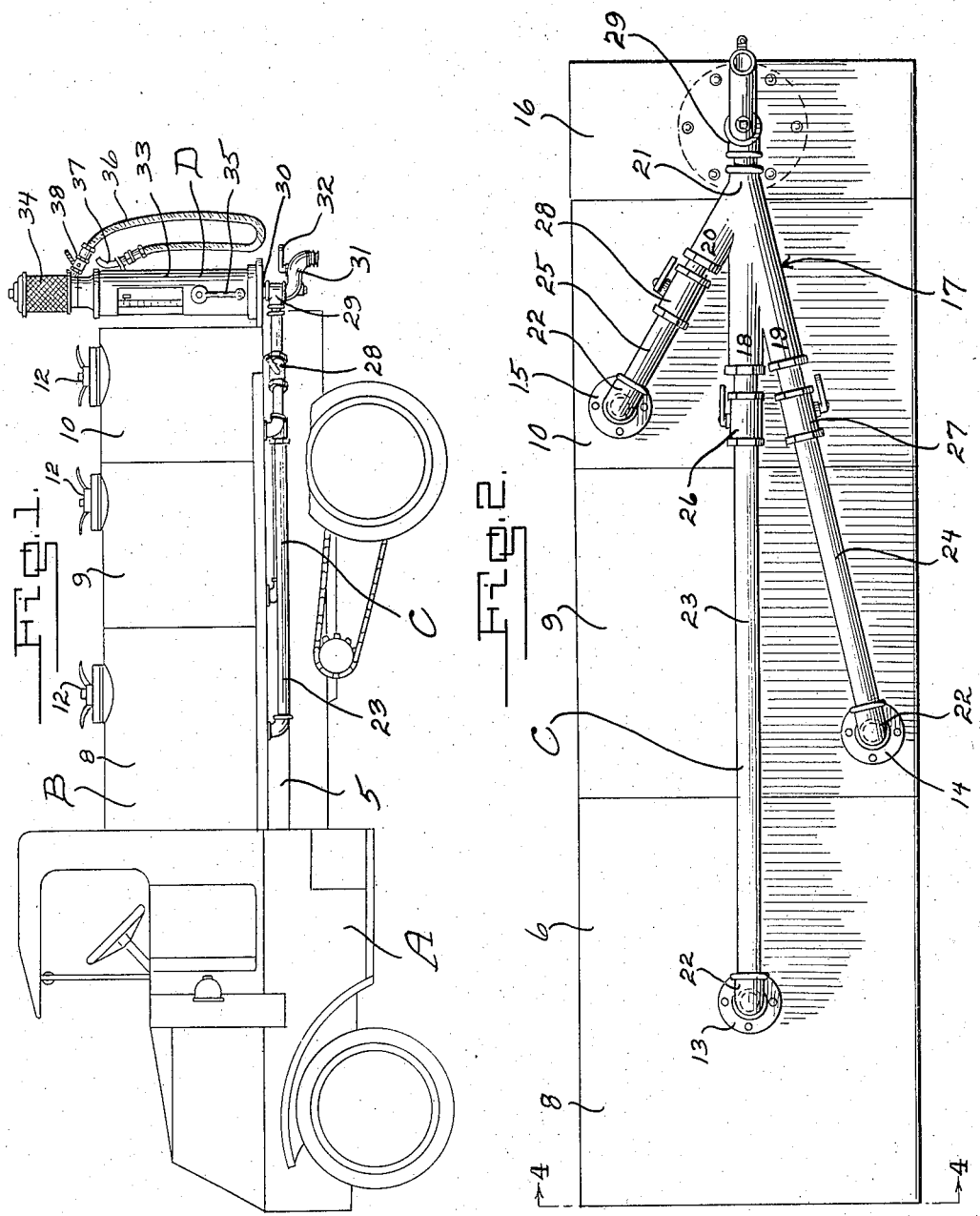
Inventor
Peter Libby
Attorney

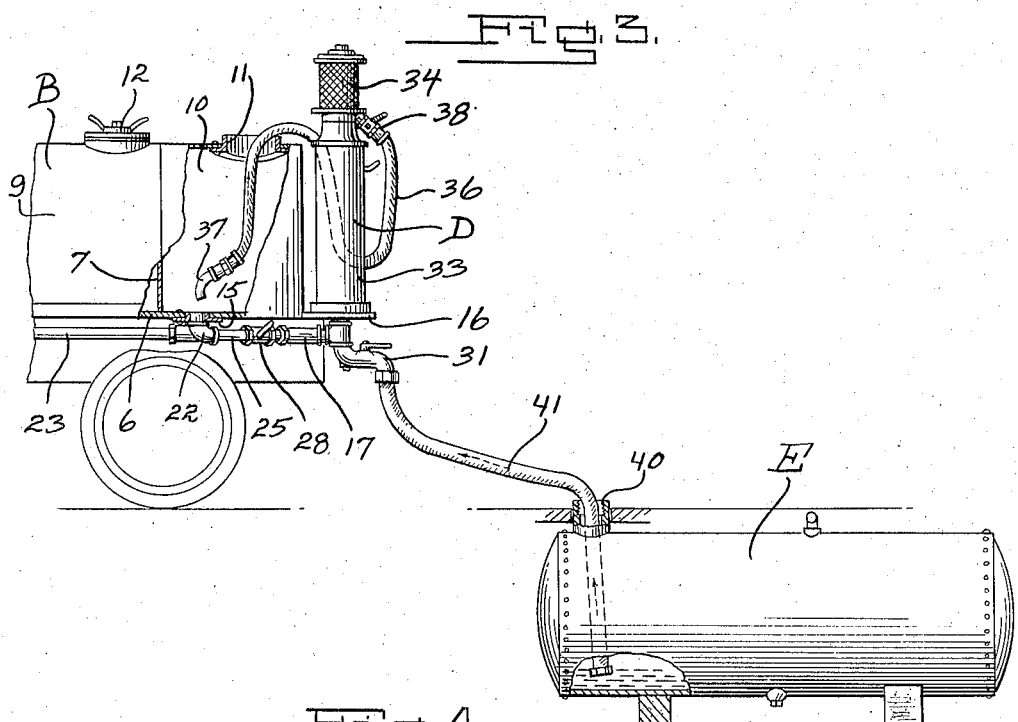
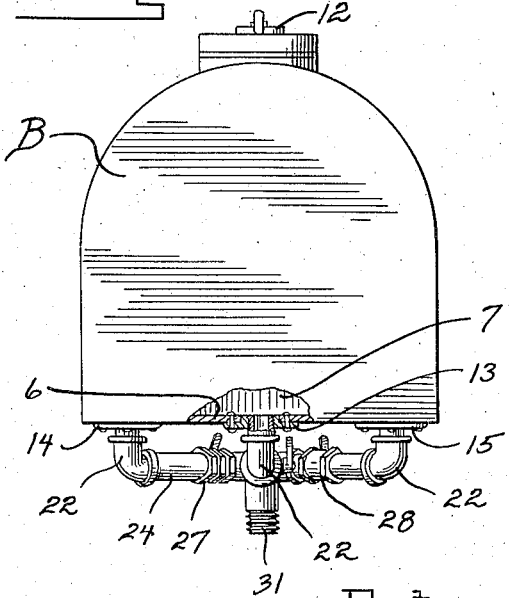

Patented Dec. 3, 1929

1,737,929

UNITED STATES PATENT OFFICE

PETER LIBBY, OF WATERVILLE, MAINE

LIQUID DELIVERY AND PUMPING APPARATUS

Application filed July 23, 1926. Serial No. 124,485.

The present invention relates to improvements in apparatus for use in the handling of liquids, and the primary object of the invention resides in the provision of an improved liquid delivery and pumping apparatus primarily intended for use in the handling of liquids such as gasoline, lubricating oils, fuel oils and the like.

A further object of the invention resides in the provision of an improved type of tank vehicle embodying a number of independent compartments of various capacities, with dispensing means connected with each compartment and delivering to a common terminal whereby the compartments may be independently emptied thru a single discharge faucet.

A further object of the invention resides in the provision of a tank vehicle of the aforementioned character embodying a measuring means so associated with the dispensing means of the vehicle tank as to permit of the same being used either for the delivering of a given amount of liquid from either of the compartments of the tank, when not desiring to dispense the entire contents of the compartment, or for the withdrawing of a liquid from a storage receptacle such as an underground tank, and storing the same temporarily in one of the compartments of the vehicle tank.

A still further object of the invention resides in the provision of an improved type of tank vehicle embodying a measuring apparatus whereby the liquid may be measured either when being dispensed from the tank of the vehicle when being delivered into the tank of the vehicle.

Other objects and advantages of the invention will be apparent during the course of the following detailed description, taken in connection with the accompanying drawings forming a part of this specification and in which drawings:

Figure 1 is a side elevation of a motor vehicle equipped with the improved liquid delivering and pumping apparatus.

Figure 2 is a bottom plan view of the improved tank and dispensing means therefor.

Figure 3 is a view illustrating the rear portion of the vehicle, parts being broken away, and showing the apparatus connected with an underground storage tank for the withdrawing of liquid from the tank and delivering the same into the vehicle tank.

Figure 4 is an end elevation looking at the tank from its forward end along the line 4—4 of Figure 2.

Referring to the drawings in detail, and wherein similar reference characters designate corresponding parts throughout the several views, the letter A may designate a conventional type of motor vehicle, B a tank mounted upon the vehicle A and provided with the dispensing means C, and D a combined pumping and measuring means mounted upon the vehicle A at the rear end of the tank B. The letter E may designate a suitable storage tank and in the example shown illustrates an underground storage tank.

The motor vehicle shown may be of any preferred type, provided with a suitable frame 5 for mounting of the tank B.

Referring now to the improved tank B, the same is preferably provided with a flat bottom 6, and divided transversely as by means of partitions 7 into a number of independent compartments 8, 9, and 10, with each compartment provided at its upper side with a filler opening 11 provided with a suitable closure cap 12. These compartments 8, 9, and 10 are preferably of different capacities, and as an example, the compartment 8 may be of three hundred gallons capacity, compartment 9 of two hundred and fifty gallons capacity, and the rearmost compartment 10 of two hundred gallons capacity. Secured to the bottom wall of each of the compartments 8, 9, and 10, are flanged rings 13, 14, and 15 respectively, and which flanged rings provide outlet openings in the bottom of each of the respective independent compartments.

A suitable shelf or extension 16 carried either by the tank B or the vehicle frame 5, projects rearwardly from the rear bottom portion of the tank B, for mounting of the combined pumping and measuring means D.

The dispensing means C, and which permits of independent emptying of either of the compartments 8, 9, or 10 thru a single discharge faucet, is arranged below the bottom wall 6 of the tank, and embodies a terminal 17 in the form of a double Y fitting forming independent inlet branches 18, 19, and 20, and a rearwardly opening outlet branch or stem 21. Connected respectively, and by means of elbows 22 to the flanged outlet rings 13, 14 and 15, are drain pipes 23, 24, and 25 which extend rearwardly in converging relation with their rear or opposite ends suitably connected with the forward open ends of the inlet branches 18, 19, and 20 respectively. Disposed in the line of each of the drain pipes 23, 24, and 25, are cut-off valves 26, 27, and 28 respectively which serve for independently closing communication between their respective tank compartments and the terminal fitting 17. Connected with the outlet branch or stem 21 of the terminal fitting 17, is a T fitting 29 having its run disposed verticaly beneath the shelf or extension 16, and connected with the upper end of the fitting 29, is a stand pipe 30 which extends upwardly thru the shelf 16 for connection with the combined pumping and measuring means D. A faucet 31 provided with a suitable operating handle 32, is connected at the lower end of the T fitting 29 and said faucet provides a single discharge opening connected with the independent compartments 8, 9, and 10.

Referring now to the combined pumping and measuring means D, and which is intended for mounting upon the shelf 16 at the rear of the tank B, the same embodies a vertically disposed pump structure 33 having a measuring chamber 34 mounted upon the upper end thereof at an elevation disposed above the top of the tank B. The pump 33 may be operated in any desirable manner, and in the example shown a crank 35 has been provided for operation of the pump mechanism. The pump 33 is connected at its lower end with the stand pipe 30, and the crank 35 operates for pumping the liquid into the measuring chamber 34 at an elevation above the tank B. Connected to the lower end of the measuring chamber 34, is a flexible hose 36 of a length capable of extending forwardly along the tank B so that the nozzle 37 may be disposed in any one of the filler openings 11 of the independent compartments 8, 9, or 10. A valve 38 may be provided in the hose 36 for controlling the liquid passing therethrough. By so having the measuring chamber 34 disposed above the tank B, it will be seen that the liquid from the chamber 34 may drain into any one of the independent compartments of the tank.

The underground storage tank E is provided with the usual filler opening 40 and thru which opening a feed house 41, suitably connected with the faucet 31, may be passed for permitting of the liquid contained in the tank B to drain by gravity into the storage tank upon operation of the desired valves of the dispensing means C.

As to the manner of use to which the apparatus is adapted, and first assuming that it is desirable to place two hundred and fifty gallons of the liquid from the tank B into the storage tank E, the feed hose 41 is first connected with the faucet 31 and passed thru the filler opening 40 into the tank E. The handle 32 of the valve 31 may then be operated for opening of the valve, and then upon opening of the valve 27 of the drain pipe 24 connected with the two hundred and fifty gallon compartment 9, the liquid will be allowed to readily flow from the compartment 9 into the storage tank E. Thus it will be seen that when drawing the full amount from the compartment, the liquid need not pass thru the measuring means D. It will readily be apparent the manner in which the valves 26 and 28 may be operated for draining of the compartments 8 and 10 respectively if it be desirable to place three hundred or two hundred gallons of the liquid in the tank E. As a second manner of use, and when it is desirable to place but a portion of the liquid in one of the compartments of the tank B into the storage tank E, the valve 31 is closed and the feed hose 41 removed from the tank E. The flexible hose 36 may then be placed in the filler opening 40 and upon opening of the desired valves 26, 27, or 28, the pump 33 may be operated so as to pass the liquid into the measuring chamber 34 and upon opening of the valve 38, the liquid from the measuring chamber may readily flow thru the hose 36 into the tank E. Thus it will be seen that any desired amount of liquid may be withdrawn from any one of the compartments of the tank B and delivered thru the combined pumping and measuring means D without the necessity of withdrawing the whole amount of one of the compartments of the tank. It will also be apparent that upon closing of the facuet 31, that the combined pump and measuring means D may be operated upon proper positioning of the valves 26, 27 and 28, for transferring of the liquid from one of the tank compartments into another compartment of the tank.

With the existing type of underground storage tank, and after continued use, a quantity of water settles to the bottom of the tank, and it is desirable to remove this water in order that the tank will not become corroded. A further use of the apparatus will be found in providing an efficient means for removal of this water. When it is desired to withdraw the water from the tank E, the feed hose 41 is connected with the faucet 31 and placed in the tank E with its open end close to the bottom of the tank. With the faucet 31 open, and all of the valves in the pipes leading from the compartments 8, 9, and 10 closed, the pump 33 may be operated for drawing the water from the underground tank and delivered thru the flexible hose 36 into one of the empty compartments of the vehicle tank as illustrated in Figure 3 of the drawings. Thus it will be seen that the pump 33 operates either for the delivering of liquid from one of the compartments of the vehicle tank, or for the withdrawing of liquid from an underground tank and storing the same temporarily in one of the compartments of the vehicle tank.

From the foregoing description it will be apparent that an improved liquid delivering and pumping apparatus has been provided embodying a vehicle tank provided with independent compartments with a measuring means so associated and connected with the independent compartments of the tank as to permit of the delivering of either the full capacity of the tank or any given amount from either of the independent compartments, and having means for the withdrawing of liquid from a storage receptacle and storing the same temporarily in one of the compartments of the tank.

Changes in detail may be made to the specific form of the invention herein shown and described, without departing from the spirit of the invention or the scope of the following claims.

I claim:

1. In an apparatus of the class described, the combination of a tank provided with independent compartments, gravity feed means for withdrawing the full capacity of any desired compartment independently of the remaining compartments, and means communicating with the gravity feed means for withdrawing a measured quantity of liquid from either of said independent compartments.

2. In portable apparatus of the class described, the combination of a tank divided into a number of independent compartments, a drain pipe connected in the bottom of each independent compartment and leading to a common drain terminal, a valve in each drain pipe, a drain faucet connected with the outlet branch of said terminal, and pumping means connected with said terminal between the drain pipes and said faucet whereby liquid from the tank compartments may either be dispensed by gravity feed thru said faucet or thru said pumping means.

3. In portable apparatus of the class described, the combination of a tank provided with independent compartments, gravity feed dispensing means connected with each compartment and leading to a common terminal below the tank, a valve arranged between the common terminal and each outlet opening of the independent compartments, a pump structure connected with the dispensing means to the rear of the common terminal, and a discharge hose connected with the pump structure at an elevation above the compartments of said tank.

4. In a tank vehicle, the combination of a tank provided with a number of independent compartments, a drain pipe connected with the bottom of each compartment and leading to a common terminal below the tank, a valve for each drain pipe, a drain faucet connected with the outlet branch of said terminal, a pump structure mounted on the vehicle at the rear of said tank and connected at its lower end between said terminal and faucet and including a measuring chamber mounted upon the upper end of the pump structure above the compartments of said tank, and a flexible hose connected with the measuring chamber for positioning in either of the compartments of the tank.

PETER LIBBY.